Aug. 15, 1950 G. A. BABCOCK 2,519,012
SLIDE FASTENER
Filed April 18, 1945
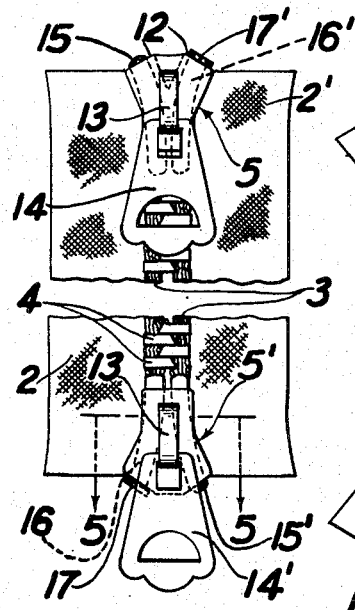
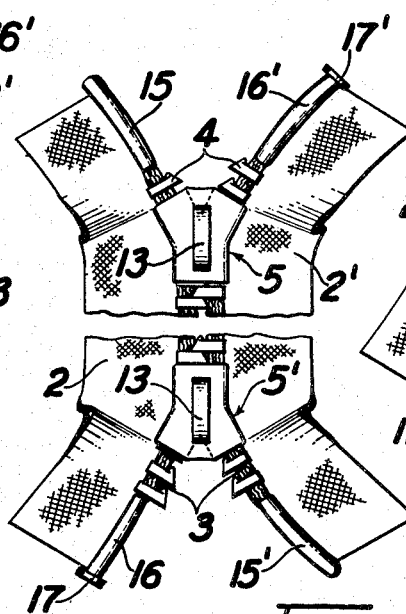
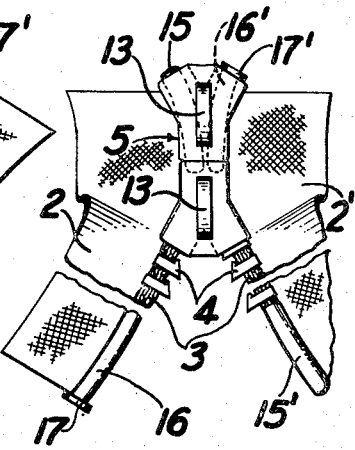
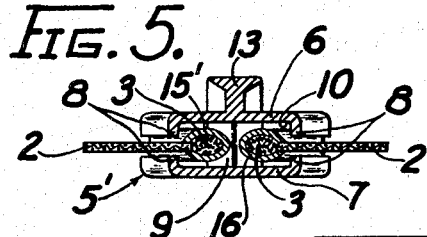
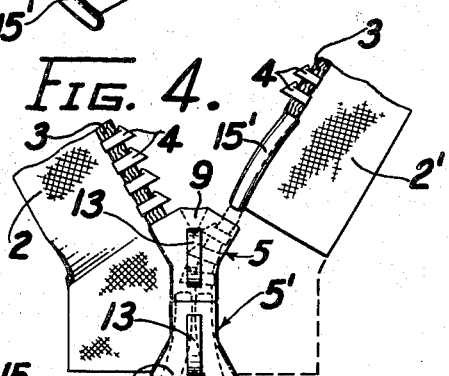
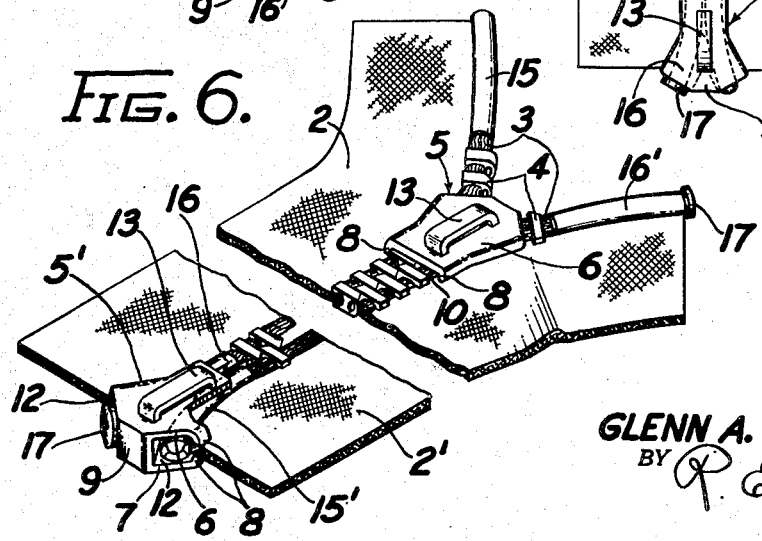
INVENTOR.
GLENN A. BABCOCK
BY R. E. Meech
ATTORNEY.

Patented Aug. 15, 1950

2,519,012

UNITED STATES PATENT OFFICE 2,519,012

SLIDE FASTENER

Glenn A. Babcock, Hohokus, N. J., assignor to Talon, Inc., a corporation of Pennsylvania Application April 18, 1945, Serial No. 588,918

12 Claims. (Cl. 24—205)

This invention relates to slide fasteners and, particularly, to an improved means permitting complete separation of the fastener stringers at either end of the fastener.

Various types of connecting devices have been heretofore suggested and used in order that the two stringers or halves of the fastener may be completely separated or disconnected from each other. Usually such connecting devices consisted of two separate parts, one part being in the form of a socket or retainer attached to the end of one stringer and the other part being a pin attached to the opposed end of the other stringer. The pin cooperated with the socket to position the series of fastener elements in proper relation for their initial engagement and to separably connect the stringers together at one end after the slider was moved along to close the fastener. Such socket or retainer member was tedious, difficult and expensive to fabricate and to assemble on the edge of the stringer.

It is one of the objects of the present invention to provide a simple and inexpensive separable end connecting means which eliminates the need of a separate socket or retainer member thereby reducing the cost of such a separable end connection to a minimum and eliminating the above mentioned disadvantages.

Sometimes it is desirable that the fastener in certain applications be opened from either end and in such case a so-called "two-way" or "double acting" type fastener necessarily must be provided. Such a fastener consists generally of two stringers having a pair of sliders positioned thereon reversely to each other so that either slider can be manipulated to open and close the fastener. In certain applications of such "two-way" fasteners, it is desirable that the fastener stringers be completely separable at either end. Heretofore, no practical means permitting complete separation of such a fastener at either end has been proposed or used. The conventional type of separable end connection could not be used successfully on a "two-way" fastener for the reason that it is necessary to move the slider to its fully open position before the parts of the end connection could be disconnected from each other, and in a two-way fastener having two sliders, both sliders would necessarily have to be moved to position at one end of the fastener so as to disengage the fastener elements before the stringers could be completely separated and none of the separable end connections as suggested has been designed to permit disconnection thereof when both sliders were at one end of the fastener. Also, if one slider was positioned at either end, even if a separable end connection were provided at one end, the stringers could not be separated for the reason that the fastener elements positioned between the sliders are always interengaged when the sliders are at the ends of the fastener.

Accordingly, it is another object of this invention to provide an improved means permitting complete separation of the stringers of a slide fastener of the "two-way" type at either end thereof when both sliders are disposed at either end.

It is a further object of the invention to provide an improved slide fastener of the "two-way" type which may be opened from either end having means incorporated therewith permitting complete separation of the fastener stringers at either end.

It is a more specific object of the present invention to provide a pair of pin members on the opposed ends of the fastener stringers which cooperate with a slider body to form a separable end connection whereby the slider body acts as a socket or retainer member for the pin members when disposed in its fully closed position.

Various other objects and advantages of this invention will be more apparent in the course of the following specification and will be particularly pointed out in the appended claims.

In the accompanying drawings, there is shown for the purpose of illustration, one embodiment which my invention may assume in practice.

In these drawings:

Fig. 1 is a plan view of my improved slide fastener in accordance with the present invention showing the fastener in its fully closed position;

Fig. 2 is a plan view similar to Fig. 1 with the pull members omitted showing both sliders positioned intermediate the fastener to partially open the same at each end;

Fig. 3 is another plan view similar to Fig. 1, with the pull members omitted, showing the fastener fully open with both sliders being positioned at one end and in position for completely separating the stringers from each other;

Fig. 4 is a plan view of the fastener similar to Fig. 3 showing how the pin members cooperate with one of the sliders to provide a separating end connection with the stringers, as shown being completely separated from each other;

Fig. 5 is a sectional view on line 5—5 of Fig. 1; and

Fig. 6 is a perspective view of my improved slide fastener showing one slider, partly in section, at its fully closed position at one end of the fastener with the other slider disposed intermediate the fastener so as partially to open the opposite end thereof.

Referring more particularly to the drawings, the invention is herein shown and illustrated in association with a slide fastener of the general type as disclosed in the patent to Sundback No. 1,219,881, granted March 20, 1917, but it will be understood that my invention may be incorporated with any of the known types of multiple operated fasteners. Such a fastener comprises a pair of flexible supports or stringer tapes 2 and 2' having attached to the opposed beaded edges 3 and 3', respectively, thereof in opposed relation a series of spaced-apart interlocking fastener elements 4, which are adapted to cooperate and interlock with each other. In providing a fastener of the "two-way" or "double acting" type whereby the fastener may be opened from either end, there is arranged on the fastener elements 4, a pair of conventional sliders 5 and 5' which are disposed reversely from each other and are adapted for longitudinal movement therealong the fastener elements for engaging and disengaging the same in a well-known manner. Each of the sliders 5 and 5' consists of a body member comprising a pair of spaced-apart wings or plate members 6 and 7 having flange portions 8 arranged along each marginal edge thereof and which are connected at one end thereof by means of an integral neck portion 9 so as to provide a Y-shaped channel in the slider body. Such channel consists of a relatively wide main or stem portion 10 and a pair of relatively narrow diverging arm portions 12. On the outer side of one of the wings of each of the sliders 5 and 5' there is arranged a longitudinally extending lug 13 to which there is pivotally and slidably attached a pull member 14 and 14', respectively, for manipulating the slider.

According to the present invention, there is attached to the beaded edge 3 of the stringer tape 2 at the end of the fastener at a point immediately beyond the endmost fastener element 4 at that end of the stringer, an elongated pin member 15, and there is attached to the beaded edge 3' of the stringer 2' at the opposite end of the fastener, a similar elongated pin member 15'. On the other end of the stringer tape 2 at the end of the fastener there is attached to the beaded edge 3 thereof at a point immediately beyond the endmost fastener element 4 at that end of that stringer, an elongated pin member 16 similar to the pin member 15 and positioned in opposed relation thereto. On the other end of the stringer 2' there is attached to the beaded edge thereof a similar elongated pin member 16' so as to provide a pair of pin members at each end of the fastener. The pin members are preferably of such length that they extend through the channel of one of the sliders and into the channel of the other when both sliders are positioned at one end of the fastener in a manner and for a purpose hereinafter to be described and are preferably curved longitudinally from one end to the other so as to facilitate passage of them into the slider channels. Each of the pin members 15, 15' and 16, 16' are formed preferably from a relatively thin piece of sheet metal or from some other suitable flat material which is bent around and securely clamped to the beaded edge 3 of the respective stringers. As shown in Fig. 5 of the drawings, the pin members are substantially oval or cylindrical-shaped in cross-section with the outer diameter of each of them being slightly less than the depth of the slider channels so that these pin members may pass easily into the slider channels.

There is integrally arranged with the pin members 16 and 16', a stop portion 17 and 17', respectively, for limiting the movement of the respective sliders along the fastener stringers and for retaining the sliders on the respective stringers after they have been completely separated from each other in a manner to be described. In the present instance, these stop portions 17 and 17' are in the form of a nail head welded or otherwise secured to the outer end of the pin members. This stop portion has an outer diameter greater than the depth of the slider channel and which diameter is preferably substantially equal to the thickness of the slider body. It will be understood, however, that these stop portions 17 and 17' may be in any desirable shape or form as long as it prevents the slider from passing off the end of the stringers. It will be seen that the sliders abut against the respective stop portions when they are moved to their fully closed or endmost positions on the fastener stringers. While there is shown herein one of the pin members 15 disposed on the end of one of the stringers and one of the pin members 16 arranged on the opposite end of that stringer, it will be understood, if desired that both pin members 15 may be arranged on one stringer, that is, one at either end with the pin member 16 carrying the stop portion 17 arranged on the opposite ends of the other stringer. Each end of the stringer tapes 2 is preferably stiffened by any suitable means in the vicinity of the pin members 15, 15' and 16, 16' so as to facilitate insertion of the respective pin members into the slider channels.

The improved fastener of my invention functions in the following manner. It will be seen that by providing two sliders on the fastener stringers and disposing them in reverse position relative to each other, that the fastener may be opened from either end as shown in Fig. 2 of the drawings. When the fastener is completely closed, as shown in Fig. 1, it will be seen that one of the sliders is disposed at each end of the fastener. In such fully closed position of the sliders, it will be seen that both of the pin-like members at each end of the fastener are disposed in the Y-shaped channels of the respective sliders 5 and 5', with one of the pin members being disposed in either one or the other of the arm portions 12 of the slider channel and with both extending into the main or stem portion 10 thereof, whereby the slider acts as a retainer for both of these pin members. In such closed position of the sliders, it will be seen that the outer end of the slider body abuts the respective stop portions 17 and 17' carried by the pin members 16 and 16' so as to limit the travel of the sliders in the closed direction, as shown in Figs. 1, 3 and 6 of the drawings.

If it is desired completely to separate the stringers from each other, assuming that the sliders are disposed in their fully closed positions, either one of the sliders 5 and 5' is moved in a direction to open the fastener toward and to the opposite end thereof until it abuts the slider at that opposite end, as shown in Figs. 3 and 4 so as completely to disengage the fastener elements 4 throughout the length of the fastener. When both sliders are positioned together at one end it will be seen that the pin members extend into the channel of the innermost slider, thereby permitting the pin member 15 or 15' as the case may be, to be moved through the channel thereof. To remove either the pin member 15 or 15' from its position in the channel of the respective slider, the end of the stringer tape is grasped adjacent the pin member 15 or 15' and it is moved out through both of the slider channels, thereby completely separating the two stringers, as shown in the full lines of Fig. 4. After the stringers have been separated as above described, it will be seen that the stop portion 17 carried by the pin member 16, prevents the sliders from passing off the end of that stringer and retains them thereon at all times and in position to again assemble the two stringers. In assembling the stringers, the reverse procedure is followed, that is, the pin member 15 or 15' as the case may be, is inserted into and through the channel of the innermost slider and into the channel of the outermost slider with the channel of the outermost slider acting as a socket or retainer until the pin member 15 or 15' is properly positioned therein to permit the proper engagement of the fastener elements by movement of the innermost slider, as shown in the broken lines of Fig. 4. By providing such an arrangement, it will be seen that the two pin members 15 and 16, in cooperation with either one or the other of the sliders, depending at which end of the fastener the sliders are disposed, provides a separable end connection.

As a result of my invention, it will be seen that there is provided an improved separable end connecting means permitting complete separation of the fastener stringers, which is simple and inexpensive in its construction and use and which can be easily and conveniently incorporated with any multiple operated fastener at each end thereof thereby permitting the fastener stringers to be separated at either end, as desired.

While I have shown and described one embodiment which my invention may assume in practice, it will be understood that this embodiment is merely for the purpose of illustration and description and that various other forms may be devised within the scope of my invention as defined in the appended claims.

What I claim as my invention is:

1. In a slide fastener of the class described adapted to be completely separated, a pair of stringers having opposed series of interlocking fastener elements carried thereby, a pair of sliders arranged on said fastener elements for longitudinal movement therealong to engage and disengage the same, each of said sliders having substantially a Y-shaped channel arranged therein, a stop member arranged on the end of one stringer for limiting the closing movement of the slider adjacent that end, a pin member arranged directly opposite thereto on that end of the opposed stringer for insertion through the channels of both of said sliders, said pin member adapted to be disposed in the slider adjacent that end when said slider is moved to its fully closed position with the stop member adapted to limit the travel of said slider whereby said slider acts as a retainer when disposed in such position, said pin member being of such length that it extends into and through the channel of one slider when the same is disposed in its fully closed position and partially into the channel of the other slider when moved adjacent to the first mentioned slider so as to permit said pin to be moved out of and through the channels of both of said sliders to effect complete separation of said stringers.

2. In a slide fastener of the class described adapted to be completely separated, a pair of stringers having opposed series of interlocking fastener elements carried thereby, a pair of sliders arranged on said fastener elements for longitudinal movement therealong to engage and disengage the same, a rigid pin member arranged on the end of one of said stringers for insertion through both of said sliders, a similar pin member arranged on the end of the other stringer in opposed relation to said first mentioned pin member and having a stop portion arranged therewith for limiting the closing movement of the slider adjacent that end, both of said pin members adapted to be disposed in the slider adjacent that end when said slider is moved to its fully closed position with the stop adapted to limit the travel of said slider whereby said slider acts as a retainer, at least said first mentioned pin member being of such length that it extends partially into and through the channel of one slider when the same is disposed in its fully closed position and partially into the channel of the other slider when moved adjacent thereto so as to permit said pin member to be moved out of and through the channels of both of said sliders to effect complete separation of said stringers.

3. In a slide fastener of the class described adapted to be completely separated at both ends, a pair of stringers having opposed series of interlocking fastener elements carried thereby, a pair of sliders arranged on said fastener elements for longitudinal movement therealong to engage and disengage the same, a stop member arranged on the end of each of said stringers for limiting the closing movement of the slider adjacent that end, a pin member for insertion through both of said sliders arranged on the opposed ends of said stringers so that one of each of said stop members and said pin members are disposed in opposed relation at each end, said pin member adapted to be disposed in the slider adjacent that end when said slider is moved to its fully closed position with the opposed stop member adapted to limit the travel of said slider whereby said slider acts as a retainer, each of said pin members being of such length that they extend into and through the channel of one slider when the same is disposed in its fully closed position and partially into the channel of the other slider when moved adjacent thereto so as to permit the respective pin member to be moved out of and through the channels of both of said sliders to effect complete separation of said stringers.

4. In a slide fastener of the class described adapted to be completely separated at both ends, a pair of stringers having opposed series of interlocking fastener elements carried thereby, a pair of sliders arranged on said fastener elements for longitudinal movement therealong to engage and disengage the same, a rigid pin member arranged on the end of each of said stringers, another similar pin member arranged on the opposed end of said stringers, so that one of each of said first and second mentioned pin members are disposed in opposed relation at each end of the stringers, each of said second mentioned pin members having a stop portion arranged therewith for limiting the closing movement of the slider adjacent that end, both of said pin members at one end of said stringers adapted to be disposed in the slider adjacent that end when said slider is moved to its fully closed position at that end with the stop portion acting to limit the travel of said slider whereby said slider acts as a retainer, at least said first mentioned pin member being of such length that it extends partially into and through the channel of one slider when the same is disposed in its fully closed position and partially into the channel of the other slider when moved adjacent thereto so as to permit said pin member to be moved out of and through the channels of both of said sliders to effect complete separation of said stringers.

5. In a slide fastener of the class described adapted to be completely separated at both ends, a pair of stringers having opposed series of interlocking fastener elements carried thereby, a pair of sliders arranged on said fastener elements for longitudinal movement therealong to engage and disengage the same, with said sliders being positioned reversely relative to each other, each of said sliders including a body having parts defining a Y-shaped channel for passage of the fastener elements therethrough so as to provide a stem portion and a pair of diverging arm portions, a rigid pin member arranged on the end of each of said stringers, a similar pin member arranged on the opposite ends of said stringers having a stop portion arranged therewith for limiting the closing movement of the slider adjacent that end so that one of each of said first and second mentioned pin members are disposed in opposed relation at each end of the stringers, both of said pin members at one end of said stringers adapted to be disposed in the channel of the slider adjacent that end when said slider is moved to its fully closed position against said stop portion at that end with one of said first mentioned pin members adapted to be positioned in one of the arm portions of the channel and the second mentioned pin member at that end positioned in the other arm portion thereof and with both of said pin members at that end extending into and through the stem portion of said channel whereby said slider acts as a retainer, both of said pin members being of such length that they extend into the channels of one slider when the same is disposed in its fully closed position at that end of the stringers and partially into the channel of the other slider when moved adjacent thereto so as to permit either of said first mentioned pin members to be moved out of and through the channels of both of said sliders to effect complete separation of said stringers.

6. A separable end stop for slide fasteners of the class described having a pair of stringers provided with opposed series of interlocking fastener elements, and a slider arranged on said elements for longitudinal movement therealong to engage and disengage the same, said end stop comprising two independent members attached to the opposed ends of opposite stringers respectively and a movable member having a channel arranged therein, one of said members consisting of a stop member for preventing displacement of the movable member from that end of the stringer to which said member is attached, and the other of said members consisting of a pin member elongate in the direction of the stringer which is disposed in the channel of said movable member which acts as a retainer therefor with said pin member adapted to extend partially into the channel of said slider when disposed adjacent thereto and being movable out of said movable member and through the channel of said slider when said slider is abutting said movable member.

7. A separable end stop for slide fasteners of the class described, as defined in claim 6, wherein the pin member is curved longitudinally at least at its outer end portion so as to facilitate its passage through the channel of said movable member and said slider.

8. A separable end stop for slide fasteners of the class described having a pair of stringers provided with opposed series of interlocking fastener elements, and a slider arranged on said fastener elements for longitudinal movement therealong to engage and disengage the same, said end stop comprising two independent members attached to the opposed ends of opposite stringers respectively and a movable member having a channel arranged therein and adapted to be moved longitudinally along said elements, each of said members consisting of a unitary piece of material formed so as to provide a pin elongate in the direction of the stringers with a stop portion arranged on the outer end of one of said pins which cooperates with the movable member to prevent displacement of the same from that end of the stringer carrying the stop portion, both of said pins being disposed in the channel of said movable member which acts as a retainer therefor with said pins adapted to extend partially into the channel of said slider when the same is disposed adjacent said movable member and being insertable through the channel thereof and with the pin without the stop portion being movable therethrough.

9. A separable end stop for slide fasteners of the class described, as defined in claim 8, wherein both the pins are curved longitudinally at least at their outer end portions so as to facilitate their passage into and through the channel of said movable member and said slider.

10. A separable end stop for slide fasteners of the class described having a pair of stringers provided with opposed interlocking fastener elements, and a slider arranged on said elements for longitudinal movement therealong to engage and disengage the same, said end stop comprising two independent members attached to the opposed end of opposite stringers respectively and a movable member, said movable member including a body having a Y-shaped channel therein for passage of the fastener elements therethrough so as to provide a stem portion and a pair of diverging arm portions, each of said independent members consisting of a unitary piece of material formed so as to provide a pin member elongate in the direction of the stringers with a stop portion arranged on the outer end of one of said pins which cooperates with the movable member to prevent displacement of the same from that end of the stringer carrying the stop portion, one of said pins being positioned in one of the arm portions of the channel of said movable member and the other pin being positioned in the other arm portion thereof, with both of said pins extending into and through the stem portion of said channel whereby said movable member acts as a retainer, said pin without the stop portion adapted to extend partially into the channel of the slider when the same is positioned adjacent thereto and being movable through the channel of said movable member and said slider to effect complete separation of the stringers.

11. In a slide fastener of the class described adapted to be completely separated, a pair of stringers each having a series of interlocking fastener elements attached to the opposed edges thereof, a slider arranged thereon for engaging and disengaging the same, a separable end connection comprising a retainer member adapted to be moved along said fastener elements and having a channel arranged therein through which said fastener elements are adapted to pass, means arranged on one of said stringers adjacent the end of the series of fastener elements carried thereby engageable with said retainer and which acts as a stop so as to prevent displacement of the retainer from the fastener at that end thereof, and an elongated pin member arranged on the end of the other of said stringers which extends into the channel of the retainer, said pin member being of such length that it extends partially into the channel of the slider when the same is positioned adjacent said retainer so as to permit said pin to be moved out of the channel in said retainer and through the channel in said slider, said retainer member being movable relative to said first mentioned means and disengageable from said pin member when said slider is positioned at a spaced distance from said retainer and adapted to be moved along the fastener elements when the same are engaged thereabove so as to disengage the same and to permit the fastener to be opened from that end thereof on which said means and pin member are disposed.

12. In a slide fastener of the class described adapted to be completely separated, a pair of stringers each having a series of interlocking fastener elements attached to the opposed edges thereof, a slider arranged thereon for engaging and disengaging the same, a separable end connection comprising a retainer member adapted to be moved along said fastener elements and having a channel arranged therein through which said fastener elements are adapted to pass, and an elongated pin member arranged on the end of each of said stringers adjacent the end of the series of fastener elements carried thereby both of which extend into the channel of the retainer member, one of said pin members having means carried thereby which cooperates with the retainer member and acts as a stop so as to prevent displacement of the retainer from the fastener at that end thereof, both of said pin members being of such length so as to extend partially into the channel of the slider when the same is positioned adjacent said retainer so as to permit the pin member without the stop to be moved out of the channel in said retainer and through the channel of said slider, said retainer member being movable relative to both of said pin members and disengageable therefrom when said slider is positioned at a spaced distance from said retainer and adapted to be moved along the fastener elements when the same are engaged thereabove so as to disengage the same and to permit the fastener to be opened from that end thereof on which said pin members are disposed.

GLENN A. BABCOCK.

REFERENCES CITED

The following references are of record in the file of this patent:

UNITED STATES PATENTS

| Number | Name | Date |
| --- | --- | --- |
| 1,817,838 | Poux | Aug. 4, 1931 |
| 1,934,084 | Murphy | Nov. 7, 1933 |
| 2,114,747 | Murphy | Apr. 19, 1938 |
| 2,146,714 | Austin | Feb. 14, 1939 |
| 2,341,331 | Parkin | Feb. 8, 1944 |
| 2,355,996 | Morin | Aug. 15, 1944 |